United States Patent
Raheem

(10) Patent No.: US 7,650,356 B2
(45) Date of Patent: Jan. 19, 2010

(54) GENERATING AN OPTIMIZED RESTORE PLAN

(75) Inventor: Michael S. Raheem, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 351 days.

(21) Appl. No.: 10/924,511

(22) Filed: Aug. 24, 2004

(65) Prior Publication Data
US 2006/0047626 A1 Mar. 2, 2006

(51) Int. Cl.
G06F 7/00 (2006.01)
G06F 17/00 (2006.01)

(52) U.S. Cl. .................. 707/102; 707/202; 707/204; 711/161; 711/162

(58) Field of Classification Search ............... None
See application file for complete search history.

(56) References Cited

U.S. PATENT DOCUMENTS

| | | | |
|---|---|---|---|
| 6,304,882 B1* | 10/2001 | Strellis et al. | 707/202 |
| 6,691,117 B2* | 2/2004 | Ellison et al. | 707/10 |
| 6,704,886 B1 | 3/2004 | Gill et al. | 714/6 |
| 7,003,531 B2* | 2/2006 | Holenstein et al. | 707/201 |
| 7,020,697 B1* | 3/2006 | Goodman et al. | 709/223 |
| 7,043,504 B1* | 5/2006 | Moore et al. | 707/202 |
| 7,065,541 B2* | 6/2006 | Gupta et al. | 707/204 |
| 7,149,787 B1* | 12/2006 | Mutalik et al. | 709/217 |
| 7,209,968 B1* | 4/2007 | Secer | 709/226 |
| 7,386,752 B1* | 6/2008 | Rakic et al. | 714/2 |
| 2002/0107837 A1* | 8/2002 | Osborne et al. | 707/2 |
| 2003/0177149 A1* | 9/2003 | Coombs | 707/204 |
| 2003/0187847 A1* | 10/2003 | Lubbers et al. | 707/9 |

FOREIGN PATENT DOCUMENTS

EP  1 359 506 A3  11/2003

OTHER PUBLICATIONS

Designing a resourceful fault-tolerance system, by Giguette et al, The Journal of Systems and Software 62 (2002) 47-57.*
EMC Data Manager, "EMC EDMBackup for Microsoft SQL Server, Release 4.1.0, Chapter 4, Restoring Backups," *EMC Corp.*, 2002, 20 pages.

(Continued)

*Primary Examiner*—Tim T. Vo
*Assistant Examiner*—Jay A Morrison
(74) *Attorney, Agent, or Firm*—Woodcock Washburn LLP

(57) ABSTRACT

A restore advisor may generate and apply a recovery plan to restore a database to a specified point in time. A restore/recovery scenario may be specified; resources, and backups available may be specified and one or more optimized restore plans may be generated. One or more alternate plans may be requested. The plans may be applied, verified or saved.

39 Claims, 4 Drawing Sheets

Computing Environment 100

OTHER PUBLICATIONS

BMS Software, "Securing your Microsoft SQL Server Datapases in an Enterprise Environment," Retrieved from the Internet: http://documents.bmc.com/products/documents/21/06/12106.pdf, downloaded 2005, 11 pages.

"Breakthrough Protection and Simplicity in a Cost-Effective, Disk-Based Recovery Appliance", *International Journal of Micrographics & Optical Technology*, 2003, 21(2,3), 2-3.

Governor, J., "Salvaging a Crash Situation", *Information Week*, 1997, 11, 24-25.

Hayes, M. et al., "Just How Prepared are You?", *Computing*, 2003, 14.

Howlett, D., Make Light of a Server Crash [backup and restore tool], *PC User*, 1996, 279, 37.

Kaczmarski, M. et al., "Beyond Backup Toward Storage Management", *IBM Systems Journal*, 2003, 42(2), 322-337.

Starnes, W.W., "Things that Go Bump on the Network", *Communication News*, 1999, 36(9), 86, 89.

Tonner, D., "Be Prepared.. Be Very Prepared", *Information*, 2003, 24-28.

\* cited by examiner

GENERATING AN OPTIMIZED RESTORE PLAN

FIELD OF THE INVENTION

The invention relates to restoring a database after a system failure and in particular to generating an optimized restore plan.

BACKGROUND OF THE INVENTION

Restoring a database after a system failure or a data loss requires a plan to restore the database to the pre-failure state. For large databases or databases with high volumes of transactions, building the restore plan is a complex and tedious task. It typically requires identification of the backups of the database and determination of the correct order of application of the backups to bring the database to the specific point in time prior to the failure.

Depending on the specific conditions associated with the system failure, system resources available and backup media available, there may be several possible restore plans. Some plans may be less efficient than others. Some plans may be impossible to implement because of the unavailability of backup media or system resources. Frequently there is a sense of urgency associated with restoring the system to operation, so a restore plan must be developed quickly.

It would be helpful if there were a way to generate an optimized restore plan quickly and easily to aid in disaster recovery.

In addition to dealing with system crashes, it may be desirable to verify that a restore plan is available, should a crash occur. For example, a business may want to verify that, should a database crash, it could be recovered, and recovered in the shortest period of time possible.

It would be helpful if there were a way to generate an optimized restore plan quickly and easily so that the availability of backup media and the presence of an optimized restore plan could be verified.

It may be desirable to verify a duplicate database against a production database. For example, suppose someone has deleted data but the time at which the data was deleted is unknown. It may be helpful to be able to create and apply a restore plan to an intermediate point in time so that the two databases can be compared to determine when the data was deleted. It may be helpful to be able to create a copy of a database at a particular point in time, perhaps to determine the time at which a data loss occurred, or for other reasons such as, for example, for the purpose of an audit. An optimized restore plan would be helpful to create the duplicate database in the most efficient manner to a specified point in time.

SUMMARY OF THE INVENTION

A restore advisor may generate and apply a recovery plan to restore a database to a specified point in time. A restore/recovery scenario may be specified; resources, and backups available may be specified and one or more optimized restore plans may be generated. One or more alternate plans may be requested. The plans may be applied, verified or saved.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Suppose that at 2 pm on a Tuesday, just when the maximum number of users is relying on a computer system, the database crashes. Suppose the last full backup (a copy of the entire database) was last taken at time $t_0$, to tape and the time of the crash is $t_0+n$. To restore the database to a time just before the crash will require restoring the last full backup and applying the transaction log to a point just before the crash.

Now suppose three transaction log backups were taken at times $t_1$, $t_2$ and $t_3$ to tape. Suppose further that a differential backup, (a copy of changes to databases since last full backup), was taken at $t_4$ to CD and a fourth log backup was taken at $t_5$ to CD. It is now $t_5+n$. What is the best (fastest) way to get the system back up and running? One way is to apply the last full backup (the backup at $_0$) and then apply the four log backups in order ($t_1$, $t_2$, $t_3$ and $t_5$) and then apply the log to a point just before the crash. Another way is to apply the last full backup (the backup at $t_0$) and then apply the differential backup (at time $t_4$), the transaction log backup at $t_5$ and the log to a point just before the crash. What if the tape for the second log backup is defective? What if the CD on which the differential backup is stored is in Sacramento and the system is in Baltimore?

In accordance with some embodiments of the invention, an optimized restore plan to restore a database to a specified point in time is determined. In response to received input, an alternate plan may be determined. In some embodiments of the invention, the alternate plan is the next best plan, in terms of time to restoration of the database.

Exemplary Computing Environment

Figure 1:
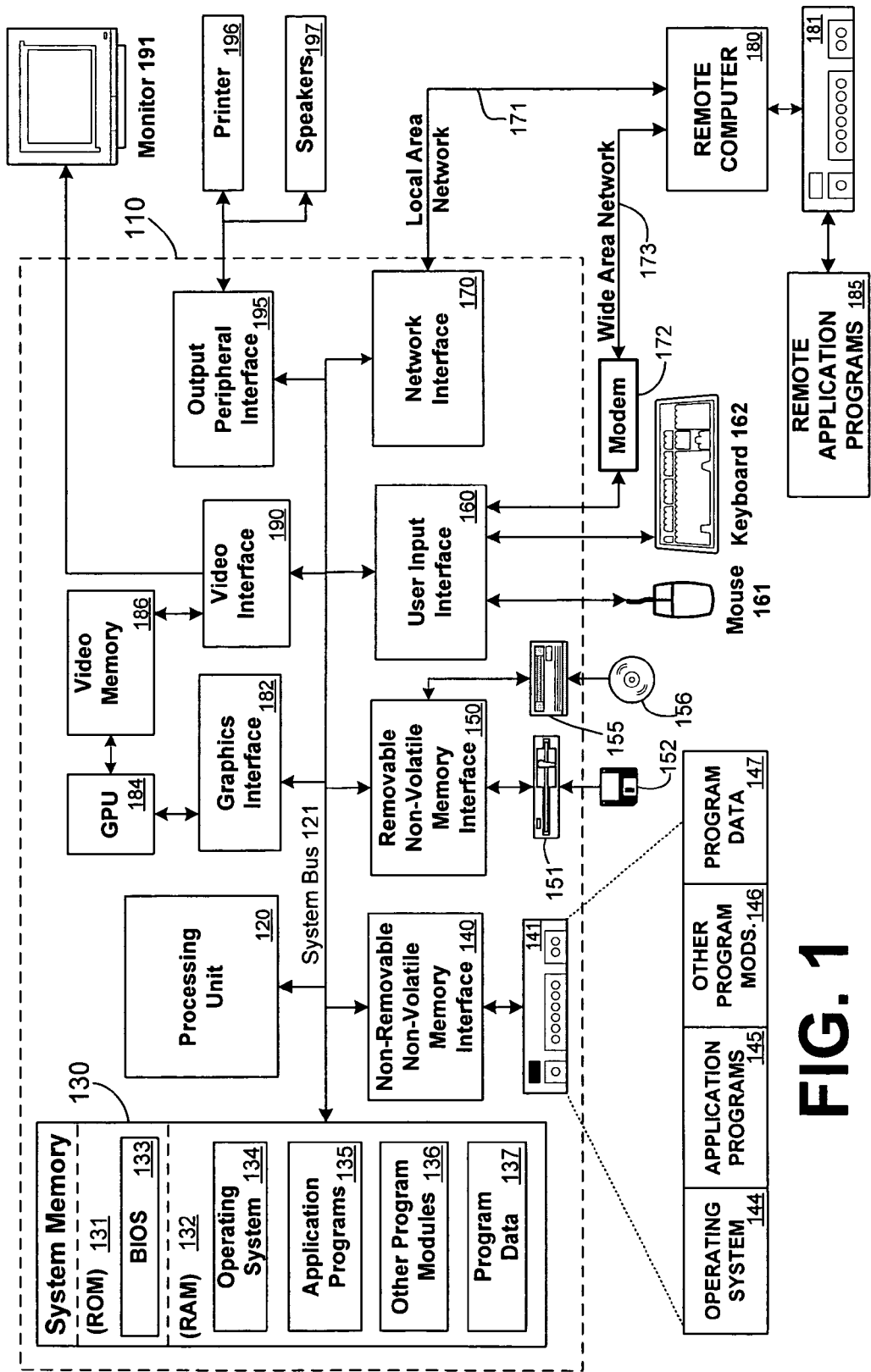
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Generating an Optimized Restore Plan

Figure 2:
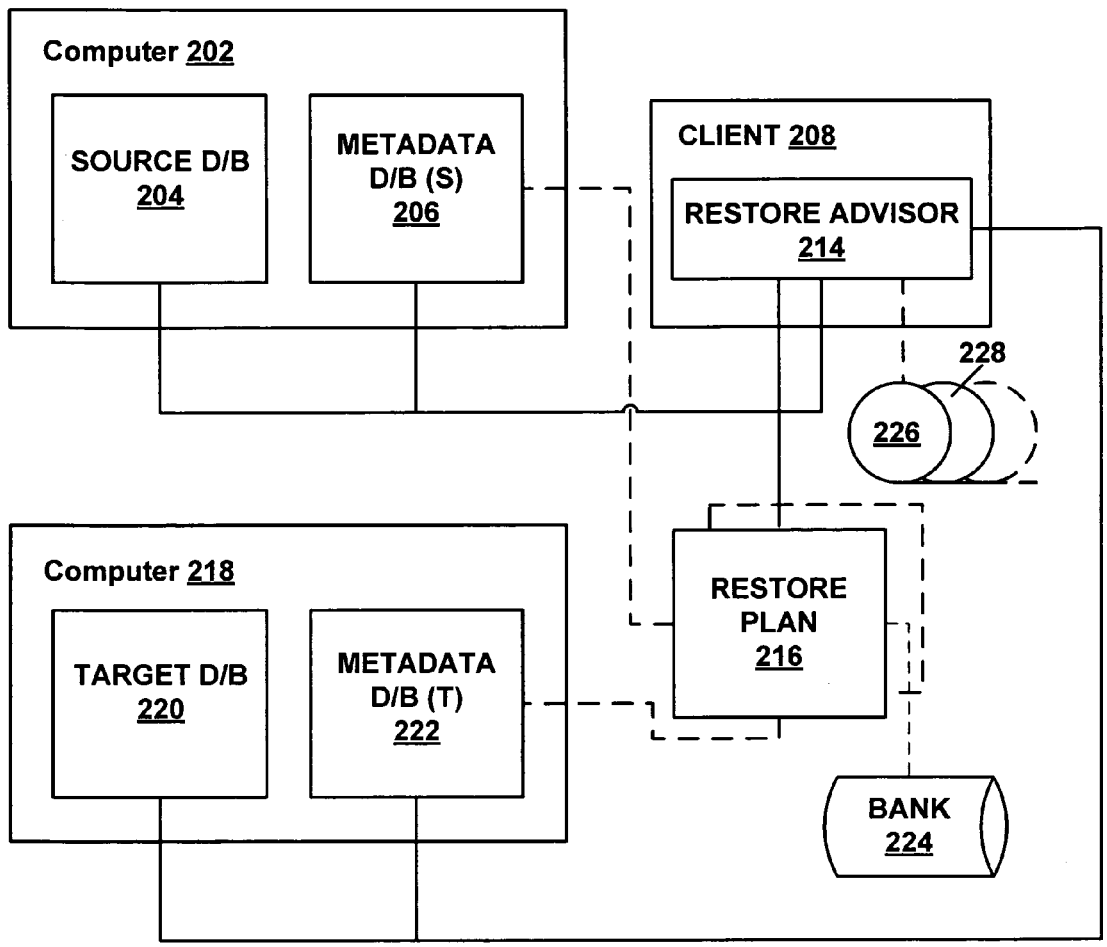
FIG. 2 is a block diagram of an exemplary system for generating an optimized restore plan in accordance with one embodiment of the invention.

FIG. 2 is a block diagram of an exemplary system for generating an optimized restore plan in accordance with some embodiments of the invention. Computers 202 and 218 may be a computer such as computer 110 described above with respect to FIG. 1. A database 204 may reside on computer 202. Additionally, a database such as metadata database 206 may reside on computer 202. Database 204 may represent a source database for which backups are taken.

Figure 3:
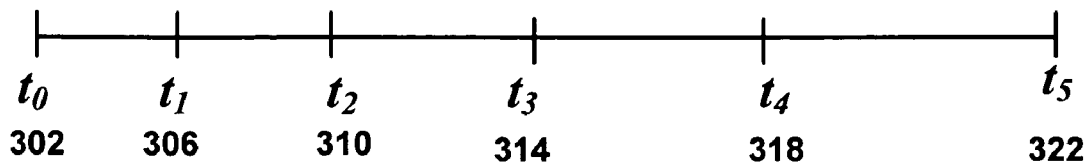
FIG. 3 is an exemplary timeline of backups in accordance with aspects of the invention.

FIG. 3 is an exemplary timeline of backups that may be made of a database such as database 204. A database backup may be a full backup, a differential backup or a transaction log backup. As used herein, a full backup creates a copy of the entire database and may include both the present state of the database and a log of transactions that were applied to the database up to that point, a transaction log backup makes a copy of transactions from a start time to an end time and a differential backup makes a copy of transactions applied to the database from a period of time beginning at the last full backup to the time at which the differential backup is taken.

Referring now to FIG. 3, at $t_0$ 302, a full backup (e.g., Backup 1 304) may be made. Backup 1 304 may contain a copy of the state of the database as it existed at $t_0$. At $t_1$ 306 a log backup (e.g., Backup 2 308) may be made. Backup 2 308 may contain transactions applied to the database from time $t_0$ 302 to time $t_1$ 306. At $t_2$ 310 a log backup (e.g., Backup 3 312) may be made. Backup 3 312 may contain a log of transactions applied to the database from time $t_1$ 306 to time $t_2$ 310. At $t_3$ 314 a log backup (e.g., Backup 4 316) may be made. Backup 4 316 may contain a log of transactions applied to the database from time $t_2$ 310 to time $t_3$ 314. At $t_4$ 318 a differential backup (e.g., Backup 5 320) may be made. Backup 5 320 may contain changes to the database from time $t_0$ 302 (the time of the last full backup) to time $t_4$ 318. At $t_5$ 322 a log backup (e.g., Backup 6 324) may be made. Backup 6 324 may contain a log of transactions applied to the database from time $t_3$ 314 to time $t_5$ 322.

In some embodiments of the invention, a transaction log operates logically as a serial string of log records. Each log record includes the transaction and is identified by a log sequence number, LSN. An LSN may be a sequential number associated with each transaction, such that each new log record written to the logical end of the log is associated with an LSN than is higher than the LSN of the record before it. Thus, a transaction occurring earlier in time will have an LSN that is smaller than a transaction that occurs later in time. Similarly, if a first transaction has a first LSN, the next transaction will have an LSN that is higher than the LSN of the previous transaction.

When a backup is performed on database 204, information associated with the backup may be stored in source metadata database 206, as well as on the media storing the backup, here represented by storage media 226, 228, etc. The information that may be stored in source metadata database 206 and/or on the storage media 226, 228, etc. may include an indicator of the type of storage media (tape, CD, disk, DVD, etc.), the volume identifier of the storage media, a beginning log sequence number (LSN) for the first transaction stored on the storage media, an ending LSN for the last transaction on the storage media, the type of backup performed, the drive or device on which the backup was performed, the date of the backup, etc.

Hence, for FIG. 3, information concerning Backup 1 304, Backup 2 308, Backup 3 312, Backup 4 316, Backup 5 320, and Backup 6 324 may be stored in source metadata database 206, and/or on the storage media. The information that may be stored in source metadata database 206 may include the volume identifier of the storage media, a beginning log sequence number (LSN) for the first transaction on the storage media, an ending LSN for the last transaction on the storage media, etc.

A restore advisor such as exemplary restore advisor 214 may reside on a client 208 as shown in FIG. 2. It will be appreciated that client 208 may reside on computer 202, 218 or on another computer. Similarly restore advisor 214 may reside on computer 202, 218 or on another computer and may be run against source database 204 to create target database 220 and target metadata database 222 from any location. The restore advisor 214 may be embedded within a database management tool and may be implemented as a pluggable component.

When the restore advisor 214 is invoked, an optimized restore plan such as restore plan 216 may be generated. An optimized restore plan may identify which backups must be applied in what order to recreate a database in the most efficient way possible given a set of constraints. In some embodiments one or more restore plans 216, etc. may be generated. The restore plans 216, etc. may be stored in source metadata database 206, target metadata database 222 or in a separate bank 224. Information about backups used by the restore advisor 214 to produce the restore plan(s) may be retrieved from one or more of: a source metadata database 206, a target metadata database 222, backup media 226, 228, etc., bank 224 or from user input.

Figure 4:
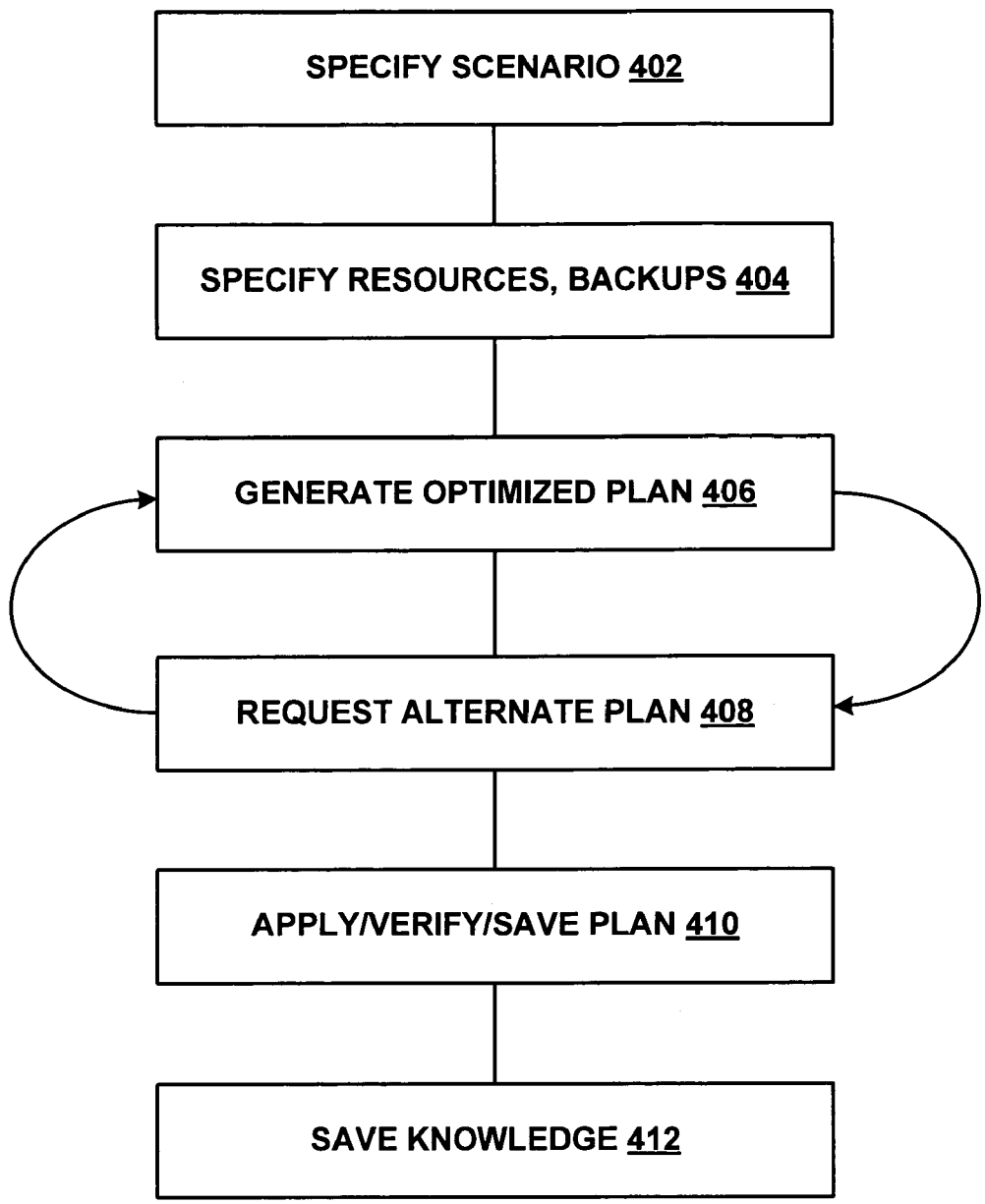
FIG. 4 is a flow diagram of an exemplary method for generating an optimized restore plan in accordance with one embodiment of the invention.

A method for creating an exemplary optimized restore plan is illustrated in FIG. 4. At step 402 in response to the notification of a database system failure or data loss or notification of a desire to verify that a valid restore plan is available, or notification that a duplicate database is to be created as the database existed at a particular point in time, an optimized restore plan tool may be invoked and the tool may be launched.

A series of scenarios categorized by various events may be displayed. The events may include system failure, data loss, maintenance tasks, etc. For example, any or all of the following scenarios may be displayed for selection: restore or recover an existing database, restore or recover an existing database to a specific point in time, restore a subset of an existing database while the database remains online, restore a subset of a database to another location for investigation, restore damaged data pages of a database, create a new database from an existing database, move a database to a new location, restore a subset of a database to extract a portion of the data and so on. A suitable scenario may be selected.

At step 404 the user may be prompted for identification and/or location of a source database, a target name and/or destination for the recovery process, a source and/or target metadata database that stores the backup history information, available system resources, available backups and backup history information and a point in time to which the database is to be recovered (e.g., a target restore time, such as, for example, "restore to most recent possible", "restore to transaction marked", "restore to a specific date/time". In some embodiments of the invention, instead of generating a restore plan to restore a database to a specified point in time, the restore plans is generated to restore a database to a particular checkpoint. A checkpoint, as described above, is a particular transaction that has been labeled. Alternatively, this information may be available from a source metadata database as described above and thus the identification of the source metadata database may be received.

The user may also specify the target date/time of the recovery and the state of the database after it is recovered (e.g., "with no recovery" or "with recovery". "With no recovery" or "with recovery" refers to the way in which incomplete transactions are handled. For example, if additional transaction logs will be applied, it may be desirable to specify restoring the database "with no recovery", meaning that incomplete transactions are not backed out. If further transactions logs will not be applied, it may be desirable to specify restoring the database "with recovery", meaning that incomplete transactions are backed out.)

At step 406 an appropriate plan of recovery for the database may be generated. In some embodiments of the invention, a bank of stored scenarios may be accessed to determine if a restore plan has already been generated for the specified scenario and database, etc. A plan may comprise one or more steps or actions to be taken to restore the database, in view of the constraints received in step 404. In some embodiments of the invention, the details of each plan step may be presented as a list of steps. Upon selection of one of the steps, details may be viewed and the backup device specified for the step may be changed.

In some embodiments of the invention, an alternate plan may be requested. For example, referring again to FIG. 3, suppose an optimized restore plan indicates that Backup 1 304 and Backup 5 320 are to be applied, in that order, but Backup 5 320 has a read error and is unusable. An alternate plan may be requested. In response to the request for the alternate plan, a second restore plan may be generated, for example, specifying that Backup 1 304, Backup 2 308, Backup 3 312 and Backup 4 316 should be applied, in that order.

At step 408 the plan may be executed, saved or verified (a "Dry Run") performed. In some embodiments of the invention, the restore plan is saved as a script file. The restore plan(s) may be saved in the source metadata database, a target metadata database or in a restore plan bank or datastore.

At step 410 the information acquired from step 404 may be stored in a source metadata database (such as source metadata database 206) a target metadata database (such as target metadata database 222). This information may be used to enable the restore advisor to "learn" from previous restore plans.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating there from. Therefore, the present invention should not be limited to any single embodiment, but rather should be construed in breadth and scope in accordance with the appended claims.

What is claimed is:

1. A system for generating an optimized restore plan for a database comprising:
   a restore advisor executing on a computer that presents to a user a plurality of restore scenarios, the plurality of restore scenarios being categorized by various events for which a restore plan is needed, each restore scenario describing characteristics of a type of database restoration desired, and the restore advisor further receives a selection from the user of one of said plurality of restore scenarios;
   wherein, in response to receiving the restore scenario selection, the restore advisor presents a series of prompts for identifying a source database, a target database, and a location of a backup history for the source database, wherein the source and target databases are each of a type in which transactions are performed against the database and a log of such database transactions is maintained;
   wherein, in response to receiving the source database, the target database, and the location of the backup history for the source database, the restore advisor automatically generates and presents to the user a first restore plan which specifies a plurality of backups to be applied and an order in which to apply the plurality of backups to satisfy requirements of the selected restore scenario; and
   wherein the first restore plan is presented as a list of steps wherein upon selection of a step, one or more step details may be viewed and a backup device specified for the step may be changed.

2. The system of claim 1, wherein the restore advisor executes the optimized restore plan to generate a restored database, the restored database comprising the target database.

3. The system of claim 1, wherein the restore advisor saves the optimized restore plan.

4. The system of claim 1, wherein the restore advisor verifies the optimized restore plan to determine if the optimized restore plan is executable.

5. The system of claim 1, wherein the optimized restore plan is saved as a script file.

6. The system of claim 1, further comprising a local source metadata database for storing the backup history for the source database.

7. The system of claim 1, further comprising a remote source metadata database for storing the backup history for the source database.

8. The system of claim 1, further comprising at least one backup media for storing the backup history for the source database.

9. The system of claim 1, wherein the restore advisor receives a point in time to which the source database is to be restored.

10. The system of claim 9, wherein the target database comprises the source database restored to the point in time.

11. The system of claim 1, wherein the restore advisor receives a request to restore the source database to a point determined by a marked transaction.

12. The system of claim 11, wherein the target database comprises the source database restored to the point determined by the marked transaction.

13. The system of claim 1, further comprising a source metadata database for storing the backup history for at least one backup.

14. The system of claim 1, further comprising a source metadata database for storing information concerning availability of at least one backup.

15. The system of claim 1, further comprising a target metadata database for storing the backup history for at least one backup.

16. The system of claim 1, further comprising a target metadata database for storing information concerning availability of at least one backup.

17. The system of claim 1, wherein the optimized restore plan specifies the plurality of backups and the order in which the plurality of backups are to be applied to generate the target database.

18. The system of claim 1, wherein applying the specified plurality of backups in the specified order results in restoration of the target database in a least amount of time.

19. The system of claim 1, wherein in response to a request from the user, the restore advisor automatically generates and presents to the user an alternative restore plan which is different from the first restore plan but which also satisfies the requirements of the selected restore scenario.

20. The system of claim 19, wherein the alternative restore plan does not include at least one unavailable backup from the first restore plan.

21. The system of claim 20, wherein the alternative restore plan does not include at least one unavailable system resource from the first restore plan.

22. A computer-implemented method for generating a database restore plan to restore a database comprising:
   the computer presenting to a user a plurality of possible restore scenarios for a source database, the plurality of restore scenarios being categorized by various events for which a restore plan is needed, and each restore scenario describing characteristics of a type of database restoration desired;
   the computer receiving a selection of one of the plurality of possible restore scenarios and a point in time to which a target database is to be restored;
   the computer automatically generating and presenting to the user a first restore plan, the first restore plan comprising a plurality of backups and a sequence in which the plurality of backups are to be applied to satisfy requirements of the selected restore scenario, wherein the source and target databases are each of a type in which transactions are performed against the database and a log of such database transactions is maintained and wherein the first restore plan is presented as a list of steps wherein upon selection of a step, one or more step details may be viewed and a backup device specified for the step may be changed; and
   in response to receiving a request for an alternate plan, the computer automatically generating an alternative restore plan which is different from the first restore plan but which also satisfies the characteristics of the selected restore scenario.

23. The method of claim 22, wherein the plurality of possible restore scenarios comprise a maintenance task.

24. The method of claim 22, wherein the plurality of possible restore scenarios comprise a data loss.

25. The method of claim 22, wherein the plurality of possible restore scenarios comprise a database failure.

26. The method of claim 22, wherein the point in time comprises reaching a marked transaction.

27. The method of claim 22, wherein the point in time comprises a date and time.

28. The method of claim 22, further comprising receiving information concerning a constraint.

29. The method of claim 28, further comprising generating the first restore plan taking into account the constraint.

30. The method of claim 22, wherein the first restore plan specifies the plurality of backups and the sequence of application of the plurality of backups to generate a target database.

31. The method of claim 30, wherein applying the plurality of backups in the sequence results in restoration of the target database in a least amount of time.

32. The method of claim 22, further comprising, in response to a request from the user, generating and presenting to the user an alternative restore plan which is different from the first restore plan but which also satisfies the requirements of the selected restore scenario.

33. A computer-readable storage medium comprising computer-executable instructions for:
   presenting to a user a plurality of possible restore scenarios for a source database, the plurality of restore scenarios being categorized by various events for which a restore plan is needed, and each restore scenario describing characteristics of a type of database restoration desired;
   receiving a selection of one of the plurality of possible restore scenarios and a point in time to which a target database is to be restored;
   automatically generating and presenting to the user a first restore plan, the first restore plan comprising a plurality of backups and a sequence in which the plurality of backups are to be applied to satisfy requirements of the selected restore scenario, wherein the source and target databases are each of a type in which transactions are performed against the database and a log of such database transactions is maintained, and wherein the first restore plan is presented as a list of steps wherein upon selection of a step, one or more step details may be viewed and a backup device specified for the step may be changed; and
   in response to a request from the user, generating and presenting to the user an alternative restore plan which is different from the first restore plan but which also satisfies the requirements of the selected restore scenario.

34. The computer-readable medium of claim 33, comprising further computer-executable instructions for receiving the point in time identified by reaching a marked transaction.

35. The computer-readable medium of claim 33, comprising further computer-executable instructions for receiving the point in time comprising a date and time.

36. The computer-readable medium of claim 33, comprising further computer-executable instructions for receiving information concerning a constraint.

37. The computer-readable medium of claim 36, comprising further computer-executable instructions for generating the first restore plan taking into account the constraint.

38. The computer-readable medium of claim 33, comprising further computer-executable instructions for specifying the plurality of backups and the sequence of application of the plurality of backups to generate a target database.

39. The computer-readable medium of claim 38, comprising further computer-executable instructions for applying the specified plurality of backups in the specified order resulting in restoration of the target database in a least amount of time.

* * * * *